United States Patent
Roman et al.

(10) Patent No.: US 10,353,480 B2
(45) Date of Patent: Jul. 16, 2019

(54) CONNECTING ASSISTANT DEVICE TO DEVICES

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/604,325

(22) Filed: May 24, 2017

(65) Prior Publication Data

US 2018/0301148 A1    Oct. 18, 2018

Related U.S. Application Data

(60) Provisional application No. 62/486,423, filed on Apr. 17, 2017.

(51) Int. Cl.
| | |
|---|---|
| H04L 12/28 | (2006.01) |
| G06F 3/01 | (2006.01) |
| G06F 3/16 | (2006.01) |
| H04W 4/02 | (2018.01) |
| H04W 4/70 | (2018.01) |
| G10L 15/00 | (2013.01) |
| G10L 15/22 | (2006.01) |

(Continued)

(52) U.S. Cl.
CPC .......... *G06F 3/017* (2013.01); *G06F 3/167* (2013.01); *G10L 15/22* (2013.01); *H04W 4/023* (2013.01); *H04W 4/70* (2018.02); *G10L 15/005* (2013.01); *G10L 25/63* (2013.01); *G10L 2015/226* (2013.01); *H04L 12/2803* (2013.01); *H04L 12/2816* (2013.01); *H04L 67/306* (2013.01)

(58) Field of Classification Search
CPC .............. G10L 15/22; G10L 2105/223; G10L 2015/226; G10L 25/63; H04L 12/2803; H04L 12/2807; H04L 12/2809; H04L 12/2816; G06F 3/017
USPC ............................. 704/270, 270.1, 271, 275
See application file for complete search history.

(56) References Cited

U.S. PATENT DOCUMENTS

6,731,724 B2    5/2004  Wesemann et al.
8,150,700 B2    4/2012  Shin et al.
(Continued)

OTHER PUBLICATIONS

U.S. Appl. No. 15/587,307 of Roman, M. et al., filed May 4, 2017.
(Continued)

*Primary Examiner* — James S Wozniak
(74) *Attorney, Agent, or Firm* — Perkins Coie LLP

(57) ABSTRACT

The present disclosure contemplates a variety of improved methods and systems for enabling set up of a variety of disparate IoT devices coupled to the framework and/or ambient operating system of an assistant device. The described solution includes a voice-driven assistant device setup process. An assistant device can determine the IoT devices in its physical environment and provide setup instructions to the user. The setup including determining voice activatable commands, device information and the adapter to allow the assistant device to operate the one or more IoT devices in response to user instructions.

15 Claims, 7 Drawing Sheets

(51) Int. Cl.
*H04L 29/08* (2006.01)
*G10L 25/63* (2013.01)

(56) References Cited

U.S. PATENT DOCUMENTS

| | | | |
|---|---|---|---|
| 8,340,975 B1 | 12/2012 | Rosenberger et al. | |
| 8,412,511 B2 | 4/2013 | Jackson | |
| 8,612,211 B1* | 12/2013 | Shires | G06F 17/27 |
| | | | 704/10 |
| 9,653,075 B1 | 5/2017 | Chen et al. | |
| 9,772,812 B1* | 9/2017 | Webster | G06F 3/1423 |
| 2002/0103582 A1 | 8/2002 | Ohmura et al. | |
| 2004/0006476 A1 | 1/2004 | Chiu et al. | |
| 2004/0179659 A1 | 9/2004 | Byrne et al. | |
| 2007/0296604 A1* | 12/2007 | Koyata | G06F 3/0238 |
| | | | 340/4.3 |
| 2010/0332231 A1* | 12/2010 | Nakano | G10L 15/063 |
| | | | 704/254 |
| 2011/0060587 A1 | 3/2011 | Phillips et al. | |
| 2011/0314153 A1* | 12/2011 | Bathiche | H04L 63/08 |
| | | | 709/225 |
| 2012/0162443 A1* | 6/2012 | Allen | G06F 3/012 |
| | | | 348/207.1 |
| 2014/0229175 A1* | 8/2014 | Fischer | G10L 15/22 |
| | | | 704/235 |
| 2014/0282045 A1* | 9/2014 | Ayanam | G06F 3/0484 |
| | | | 715/740 |
| 2014/0324648 A1* | 10/2014 | Mori | G06Q 40/123 |
| | | | 705/31 |
| 2014/0350942 A1* | 11/2014 | Kady | B60R 16/0231 |
| | | | 704/275 |
| 2015/0019227 A1* | 1/2015 | Anandarajah | G10L 15/22 |
| | | | 704/257 |
| 2015/0031342 A1* | 1/2015 | Lorenzo | H04W 4/16 |
| | | | 455/414.1 |
| 2015/0032454 A1 | 1/2015 | Blanchard et al. | |
| 2015/0140990 A1* | 5/2015 | Kim | H04W 8/186 |
| | | | 455/418 |
| 2015/0154976 A1* | 6/2015 | Mutagi | H04L 12/281 |
| | | | 704/275 |
| 2015/0269420 A1* | 9/2015 | Kim | G06F 21/32 |
| | | | 382/118 |
| 2015/0336588 A1* | 11/2015 | Ebner | G01C 21/3629 |
| | | | 701/2 |
| 2016/0027399 A1* | 1/2016 | Wilde | G06F 13/382 |
| | | | 345/520 |
| 2016/0140960 A1 | 5/2016 | Chae | |
| 2016/0314782 A1 | 10/2016 | Klimanis | |
| 2016/0344815 A1* | 11/2016 | Hyun | H04L 67/125 |
| 2016/0364002 A1* | 12/2016 | Gates | G06F 3/017 |
| 2016/0378080 A1* | 12/2016 | Uppala | G10L 15/22 |
| | | | 700/275 |
| 2017/0025124 A1* | 1/2017 | Mixter | G10L 15/32 |
| 2017/0032783 A1 | 2/2017 | Lord et al. | |
| 2017/0070478 A1* | 3/2017 | Park | H04L 67/04 |
| 2017/0083285 A1 | 3/2017 | Meyers et al. | |
| 2017/0116986 A1* | 4/2017 | Weng | G10L 15/22 |
| 2017/0125035 A1* | 5/2017 | Gao | G10L 25/72 |
| 2017/0160813 A1* | 6/2017 | Divakaran | G06F 3/017 |
| 2017/0192399 A1* | 7/2017 | Ramakrishnappa | G05B 15/02 |
| 2017/0223017 A1* | 8/2017 | Kohli | G06Q 20/40145 |
| 2017/0323279 A1* | 11/2017 | Dion | G06Q 20/18 |
| 2017/0365101 A1* | 12/2017 | Samec | G02B 27/017 |
| 2018/0032884 A1* | 2/2018 | Murugeshan | G06N 5/04 |
| 2018/0061415 A1* | 3/2018 | Penilla | G10L 15/22 |

OTHER PUBLICATIONS

U.S. Appl. No. 15/604,358 of Roman, M. et al., filed May 24, 2017.
U.S. Appl. No. 15/642,211 of Roman, M. et al., filed Jul. 5, 2017.
Non-Final Office Action dated Sep. 8, 2017 for U.S. Appl. No. 15/604,358 of M. Roman et al., filed May 24, 2017.
Restriction Requirement dated Oct. 5, 2017 for U.S. Appl. No. 15/642,211 of Roman, M., et al., filed Jul. 5, 2017.
U.S. Appl. No. 15/881,052 of Roman, M. et al. filed Jan. 28, 2018.
Non-Final Office Action dated Feb. 15, 2018 for U.S. Appl. No. 15/642,211 of Roman, M., et al., filed Jul. 5, 2017.
International Search Report and Written Opinion dated Feb. 13, 2018 for International Application No. PCT/US2018/13592, 11 pages.
Non-Final Office Action dated May 15, 2018 for U.S. Appl. No. 15/881,052 of Roman, M., et al., filed Jan. 26, 2018.
Final Office Action dated Apr. 24, 2018 for U.S. Appl. No. 15/604,358 of Roman, M., et al., filed May 24, 2017.

* cited by examiner

CONNECTING ASSISTANT DEVICE TO DEVICES

CLAIM FOR PRIORITY

This application claims priority to U.S. Provisional Patent Application No. 62/486,423, entitled "Connecting Assistant Device to Devices," by Roman et al., and filed on Apr. 17, 2017, which is incorporated herein by reference in its entirety.

TECHNICAL FIELD

The present disclosure contemplates a variety of improved methods and systems for connecting an assistant device to one or more IoT devices.

BACKGROUND

The Internet of Things (IoT) allows for the internetworking of devices to exchange data among themselves to enable sophisticated functionality. For example, assistant devices configured for home automation can exchange data with other devices to allow for the control and automation of lighting, air conditioning systems, security, etc. Thus, a smart home environment includes a number of devices that need to connect to the home's wireless network in order to exchange data. Existing solutions require users to leverage a graphical user interface (GUI) running on a mobile device to set up the connection between the assistant device and the IoT devices (e.g., lights, thermostat, audio equipment).

SUMMARY

The present disclosure contemplates a variety of improved methods and systems for setting up a framework and/or an ambient operating system to connect to a variety of disparate IoT devices. The described solution includes a voice-driven assistant device setup process. For example, the assistant device detects a Chromecast device and tells the user "I have detected a new Chromecast device, please tell me the pin code you see on-screen." The user simply reads aloud the pin code, and the assistant device finalizes the setup.

This disclosure describes a technique which allows users to set up their assistant devices (e.g., home automation devices) using a voice-based dialog for managing privacy in an environment with connected devices. In one example, a home assistant device can transmit a beacon signal to devices in the home, detect the devices, and prompt the user with setup instructions to connect the devices.

In another example, the assistant device visually recognizes devices in the home and prompts the user with setup instructions to connect to IoT devices. In some implementations, the user prompts the assistant device to initiate the setup process.

These solutions allow for the operation of the assistant devices in a natural and intuitive manner, facilitating control of unknown devices by high level commands.

Some of the subject matter described herein includes an assistant device including: a microphone array; one or more speakers; one or more processors; and memory storing instructions, wherein the processor is configured to execute the instructions such that the processor and memory are configured to: determine device information of one or more devices in proximity to the assistant device; determine a device type of one or more devices based on the device information using one or more of the local resources and/or one or more of the cloud servers; provide audio installation instructions via the speaker, wherein the installation instructions are determined based on the device type; receive a user response via the microphone; set up the assistant device to operate the one or more devices, the setup including determining voice activatable commands associated with the one or more devices.

Some of the subject matter described herein also includes an assistant device including: a microphone array; one or more speakers; one or more processors; and memory storing instructions, wherein the processor is configured to execute the instructions such that the processor and memory are configured to: detect speech being spoken by a user of an assistant device using the microphone array; determine that the speech includes a hardware activation phrase corresponding to an intention of the user to provide at least a portion of the speech to one or both of the local resources of the assistant device or a cloud server based on the hardware activation phrase; provide the portion of the speech to one or both of the local resources or the cloud server based on the hardware activation phrase; receive a response from one or both of the local resources or the cloud server; and play back audio corresponding to the response using the one or more speakers.

Some of the subject matter described herein also includes an assistant device including: one or more processors and memory storing instructions, wherein the processor is configured to execute the instructions such that the processor and memory are configured to: determine that the first speech includes a first hardware activation phrase indicating an intention to provide a first content of the first speech to a cloud server; provide the first content to the cloud server; receive a first response from the cloud server corresponding to the first content; determine that the second speech includes a second hardware activation phrase representing an intention to provide a second content of the second speech to local resources of the home assistant device, rather than the cloud server, due to increased privacy expectations regarding the second content of the second speech in comparison with privacy expectations regarding the first content of the first speech; provide the second content to the local resources; and receive a second response from the local resources corresponding to the second content.

Some of the subject matter described herein also includes an electronic device including: a speaker; a microphone; one or more processors; and memory storing instructions, wherein the processor is configured to execute the instructions such that the processor and memory are configured to: detect speech spoken by a user using the microphone; determine that the speech includes a hardware activation phrase corresponding to an intention of the user to provide at least a portion of the speech to one or both of the local resources of the assistant device or a cloud server based on the hardware activation phrase; provide the portion of the speech to one or both of the local resources or the cloud server based on the hardware activation phrase; receive a response to the portion of the speech from one or both of the local resources or the cloud server; and play back an audio output based on the response using the speaker.

DETAILED DESCRIPTION

The disclosure describes methods, systems, and devices for configuring an assistant device using voice-based dialog. Once configured, the assistant device can also aid in the setup of other devices. Thus, users can use the disclosed features to customize their homes and connect other home devices and/or IoT devices to create an automated home environment in a simplified manner. The home environment can include any physical environment within the range of the assistant device, a short range wireless network, and/or a wireless network provided by or used by the assistant device.

Figure 1:
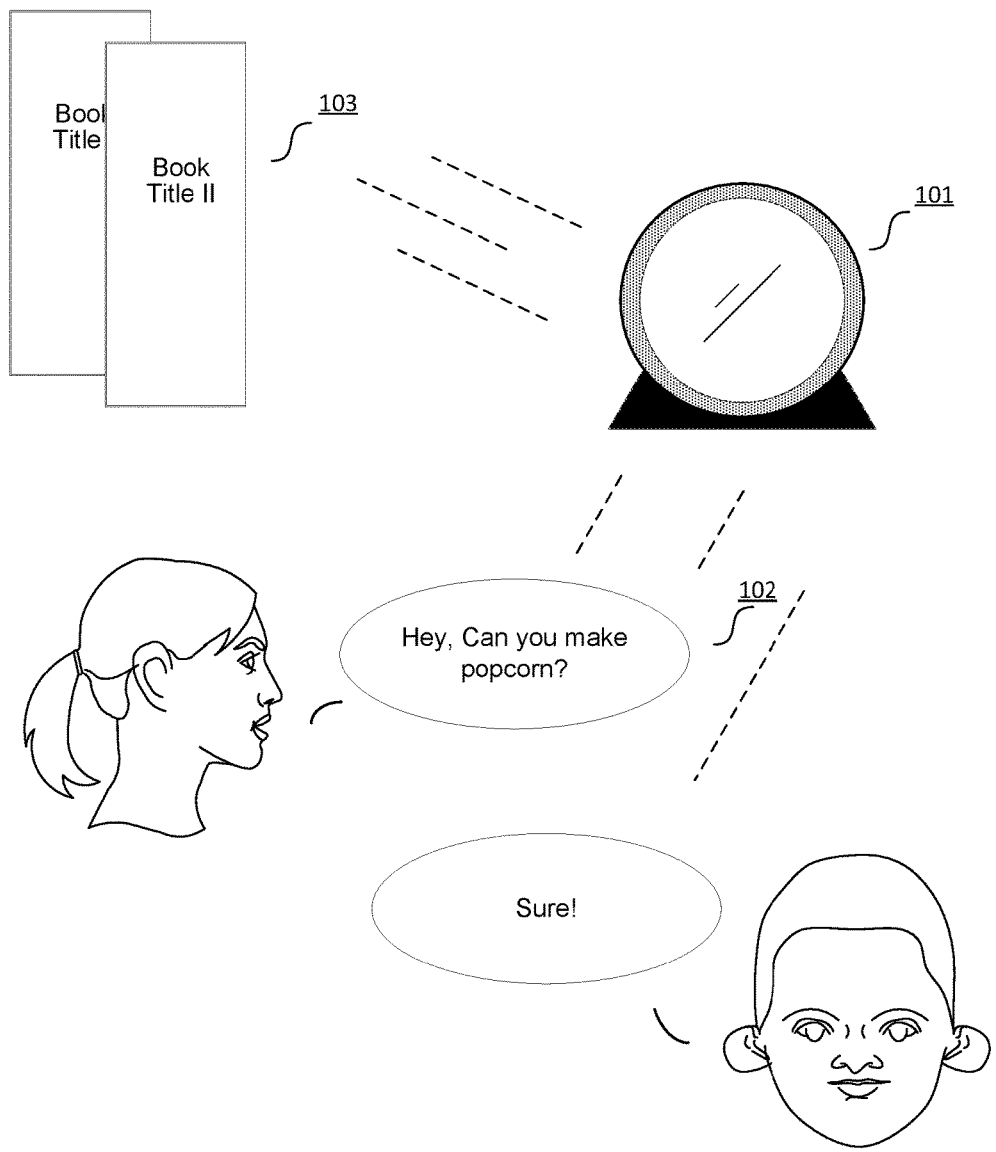
FIG. 1 illustrates an embodiment of the assistant device language determination.

An assistant device can be set up in a home environment to provide speech-based responses to a user's own speech. Because the assistant device can respond in speech, the language that the speech is based on should be familiar to the user. In at least one embodiment, the assistant device determines the language spoken in the home so it can communicate to the user in a familiar language. FIG. 1 illustrates an embodiment of the assistant device's language determination process. In an embodiment, a user can place the assistant device within her home, and once the assistant device is powered on for the first time, a language detection protocol can initiate a language determination process to determine the language to use for speech-based responses provided by the assistant device. For example, the user can power on the assistant device for the first time, and the assistant device can automatically begin determining the language spoken in its proximity. Additionally, the assistant device language determination process can be initiated by a user command, a preset activation phrase, and/or manually. In an example, the user can initiate the process by selecting the "initiate assistant device language determination process" menu item on the device screen. The language detection protocol can include the assistant device 101 detecting speech 102 for a duration of time. The language of detected words within speech 102 is then recognized to determine the language being spoken.

The duration of time for detecting speech 102 can be a preset duration of time (e.g., one minute, ten minutes, two days, etc.). In at least one embodiment, the duration of time for detecting speech 102 can include the time necessary to determine the language. For example, the assistant device 101 may detect speech 102 until a determination can be made as to the language spoken. For example, assistant device 101 can determine words within speech 102 and determine the language to which those words belong. Upon detecting a threshold number of words in a particular language (e.g., one hundred words in English), then that particular language can be used for the speech-based responses. Thus, if a word is recognized as belonging to multiple languages, assistant device 101 can continue analyzing speech 102 until one of the languages is indicated as being used a sufficient number of times. The language used most often (i.e., more words belonging to that language are detected within speech 102) can be selected by assistant device 101 to be used to provide speech-based responses. To detect speech, a speech recognition algorithm can be used. Speech recognition algorithms used can include one or more of Hidden Markov models, dynamic time warping-based speech recognition, neural networks, deep feedforward neural networks, end-to-end Automatic Speech Recognition (ASR), and/or other similar algorithms.

In at least one embodiment, the assistant device 101 can perform visual recognition of the surrounding environment to determine the language of text 103 in the home. That is, assistant device 101 can determine the presence of text upon objects within its physical environment and use that text to determine the language to use for its speech-based responses. For example, the assistant device 101 can detect a book and determine the language of text 103 on the book cover. Based on the visual recognition of the text in the surrounding environment, the assistant device can determine the language spoken in the home. The visual recognition can be based on analyzing image frames, for example, using a camera of assistant device 101. Thus, the camera of assistant device 101 can be used to capture image frames of the physical environment in which assistant device 101 is placed, and those image frames can be analyzed for textual content (e.g., text upon objects depicted in the image frames) to determine the language to be used.

In at least one embodiment, the assistant device determines the language spoken in the home by determining the geolocation of the home. The assistant device can determine the geolocation by Wi-Fi triangulation, GLONASS, GPS, and/or geographic location associated with the Internet Protocol (IP) address, MAC address, RFID, hardware embedded article/production number, embedded software number (such as UUID, Exif/IPTC/XMP or modern steganography), Wi-Fi positioning systems, or a combination of two or more of these. Once the geolocation is determined, the assistant device can determine the common one or more languages spoken in the determined location. For example, the assistant device can store a database of locations and languages usually used in those locations. As a result, the determined geolocation can be used to search the database, and the corresponding language to use for the speech-based responses can be selected. If more than one language is determined to be spoken in the determined location, the assistant device can ask for the user's preferred language.

Figure 2:
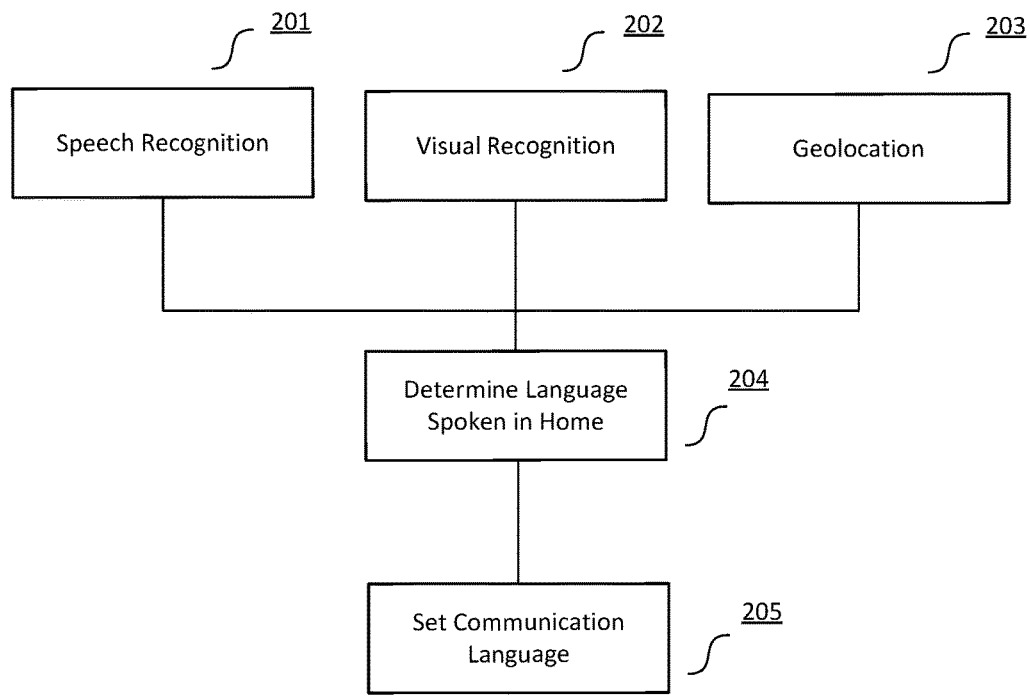
FIG. 2 illustrates an embodiment of the assistant device determining the language spoken in the home by a combination of techniques.

FIG. 2 illustrates an embodiment where the assistant device 101 determines the language spoken in the home by a combination of techniques including detecting speech 201, visual recognition 202, and/or geolocation 203 of the home. Additionally, one technique of detecting spoken words, visual recognition, and/or geolocation of the home can be configured as the primary method of language identification, and the alternative techniques can be implemented only if the primary method yields inconclusive results. In the embodiment, the assistant device determines the language spoken in the home 204, then sets the assistant device language 205 that is used to interact with the user.

In at least one embodiment, the assistant device determines that multiple languages are spoken in the home and provides an audio prompt to the user to select the preferred language. For example, if it is determined that English and Portuguese are spoken in the home, the assistant device may ask the user "Você gostaria de continuar em português? Or would you like to proceed in English?" Based on the user's response, the assistant device determines the language spoken in the home. For example, if the user responds in English, then English can be used as the preferred language. By contrast, if the user responds in Portuguese, then Portuguese can be used as the preferred language. In at least one embodiment the user's response is not sufficient to determine the language spoken in the home and the assistant device may ask the user a follow-up question.

In at least one embodiment, the assistant device does not determine the language spoken in the home but is preconfigured to communicate in a specified language. In at least one embodiment, the user can configure the language spoken at home.

Figure 3:
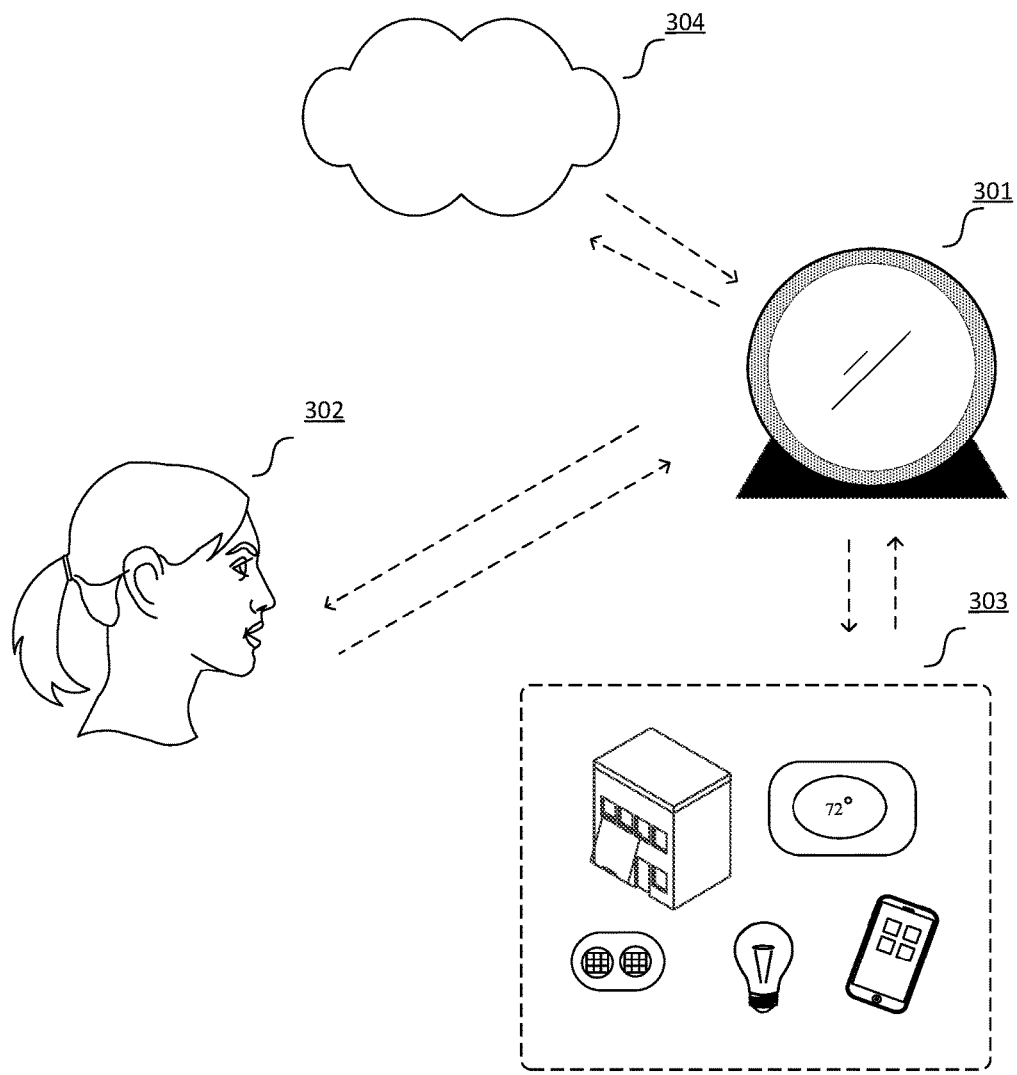
FIG. 3 illustrates an embodiment of the assistant device detection of IoT devices.

Once the assistant device has been set up, it can facilitate the setup of other devices within the environment. FIG. 3 illustrates an embodiment of the assistant device detection of IoT devices. The user 302 can initiate the detection of IoT devices, including the assistant device 301, by turning on the device for the first time, by pressing the setup button, by a verbal cue, or by a non-verbal physical cue. In at least one embodiment the assistant device monitors for devices in the environment and initiates setup once a device is detected. In at least one embodiment, the setup is initiated after the language spoken at home is determined. The verbal cue can include a preconfigured designated keyword and/or a set of words determined to have the intent to detect IoT devices. Upon IoT device detection initiation, the assistant device 301 can automatically scan the home environment for IoT devices. In at least one embodiment, the assistant device prompts the user for permission to perform detection of IoT devices 303.

IoT devices 303 can include any device that can be connected to the Internet, can communicate with a device that can be connected to the Internet and/or can communicate with devices in the home environment (e.g., temperature sensor running on OpenThread, etc.). The IoT devices can include mobile phones, mobile devices, light switches, household appliances, robotic devices, and/or wearable devices. IoT devices can also include household appliances such as freezers, ovens, air purifiers, washer, and dryers. In at least one embodiment, the IoT devices can include wearable devices, and/or robots such as robotic vacuums. In at least one embodiment, the assistant device can use the cloud 304 resources to increase processing speed and/or remote storage.

Figure 4:
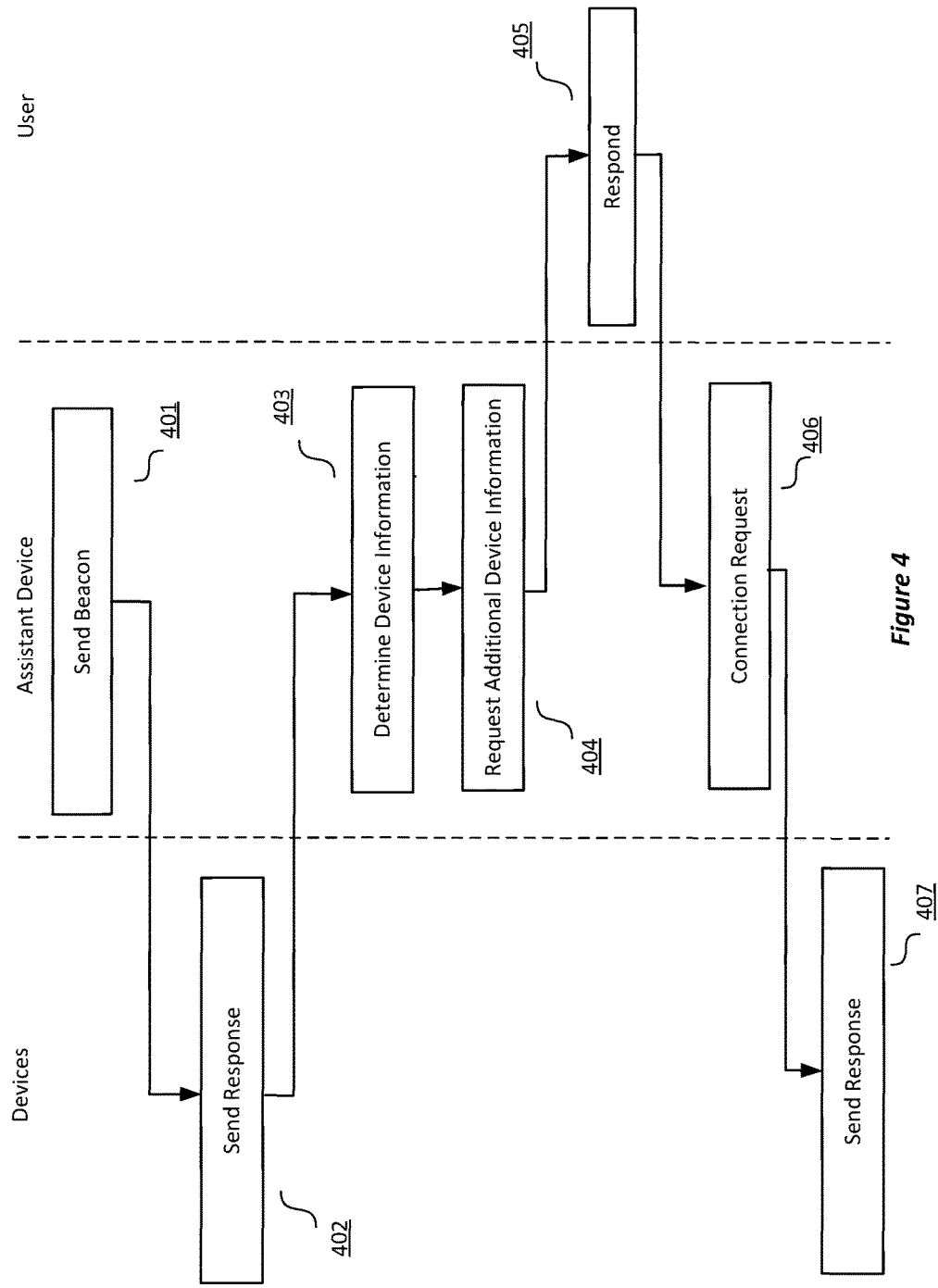
FIG. 4 illustrates an embodiment of the IoT device detection technique.

FIG. 4 illustrates an embodiment of the assistant device detection and setup of IoT devices by sending a beacon signal 401 to devices in the home. The beacon signal 401 can be sent using a wireless signal, which can include any wireless communication technology. In at least one embodiment, the beacon signal 401 can be sent via LTE, LTE-Advanced, Wi-Fi, Bluetooth, ZigBee, EnOcean, Personal area networks, TransferJet, Ultra-wideband, WiMAX, HiperMAN, Li-Fi and/or IR. The sent beacon signal can include or indicate a request for device information. In at least, one embodiment one or more devices send a beacon to the assistant device.

Upon receiving the request for IoT device information in at least one embodiment, the one or more devices send a response 402 to the assistant device with identifying information such as MAC address, Android ID, Android Advertising ID, Google Advertising ID, UDID, IDFV, IDFA, IMEI, ICCID, MEID, Windows Advertising ID and/or other identifying information. In an embodiment, the assistant device can receive beacons and/or proactively send requests to device for information. The assistant device can detect new devices by listening for beacons (e.g., mdns, sdp, etc.) and/or by proactively searching for devices. The assistant device can use a beacon type and beacon fields to determine the device and setup requirements. In at least one embodiment the identifying information includes a beacon type and beacon fields.

Once provided with the identifying information, the assistant device can determine the IoT device information, including device type 403, and the setup process for the device so that it can interact with the user to set up the device. For example, the assistant device can determine whether the IoT device is an Android phone by using the identifying information in the response. In another example, the IoT device can be determined to be a digital media player designed in a small dongle package such that it can be plugged into an input port of a high-definition television to enable streaming video services to be played back on the television. Different digital media players might be set up differently. For example, if device type 403 indicates that a first digital media player is in the environment and should be set up, then the assistant device can determine the setup process for that device, for example, by looking up the setup procedures through any of the techniques disclosed herein. If the setup process involves the digital media player displaying a pin code (e.g., a number) on the television and requiring the user to input that pin code on a website, then the assistant device can determine those steps involved in the setup process and guide the user through them. As a result, the assistant device can provide speech asking the user to verbally provide the pin code displayed on the screen. The user can then verbally provide the pin code, the speech can be picked up using the microphone of the assistant device, the pin code can be recognized from the speech, and the assistant device can access the website (or use an application programming interface (API)) and provide the pin code. This can then enable the digital media player to use its capabilities including its streaming services and, therefore, the digital media player can be set up for the user with the aid of the assistant device through speech interactions. Thus, the assistant device can guide the user through the setup process and perform some of the steps itself. This can make the setup process easier and faster. A second digital media player might have a different setup process, and the assistant device can determine the setup process for that device in a similar manner and prompt the user through the setup process.

In at least one embodiment, a user's response, statement, and/or command can be processed via a speech recognition algorithm. The user's response can be one or more of audio response and/or physical movement. The speech recognition output can be parsed to generate a transcript and/or text. The speech recognized output can be further be parsed to identify keywords and/or key phrases. For example, a user can respond "Hey assistant device, please repeat the last instruction." The assistant device can then determine the text of the audio input. The assistant device can then identify the keywords of "assistant device," "repeat," and "instruction." The assistant device can then repeat the last instruction to the user.

In at least one embodiment, the user's response is speech recognized by a combination of audio input and visual input. In an example, the user, while pointing to an IoT device, can make a statement to the assistant device "I want to set up this device." The assistant device can then identify the text of the user response, the assistant device can determine the keywords "setup," "device," and "this." The keyword "this" can trigger the assistant device to examine video input. The video input can be examined using a visual recognition algorithm. The result of the visual recognition algorithm can be used to determine that a user is pointing to a SmartTV. Based on both the visual input and the audio input, the assistant device can then determine that the user's response includes a request to set up a SmartTV.

Determining the device type can be performed locally on the assistant device. In at least one embodiment, the assistant device stores information necessary to identify a subset of IoT devices. The subset of IoT devices can include the most common IoT devices and/or IoT devices considered higher priority devices such as routers and mobile phones. Information regarding how to set up those IoT devices can also be stored in a similar manner.

In at least one embodiment, the assistant device uses a remote server to identify the device when an Internet connection is available. The remote server can include one or more of a third-party database, a third-party server, a virtual server and/or one or more servers located in the cloud. In embodiments where the assistant device prioritizes the connection order of IoT devices, the IoT device responsible for Internet connectivity can be given a higher priority. Information regarding how to set up those IoT devices can also be received in a similar manner. In at least one embodiment, once the assistant device identifies a device, a component is downloaded. The component can be downloaded from a local resource and/or one or more of a third-party database, a third-party server, a virtual server and/or one or more servers located in the cloud. The component can be responsible for driving the setup process. For example, the component can include steps required for setup, it can also include a device adapter or drive.

In at least one embodiment, the assistant device is configured to store locally the information which is needed to connect to the IoT devices responsible for Internet connectivity while relying on a remote server for information needed to connect other IoT devices.

Once the assistant device identifies multiple new IoT devices, the assistant device can prioritize the connection or setup order. For example, an assistant device that identifies a mobile phone, a wearable device, a thermostat, and a wireless router can prioritize the connection of the wireless router. For example, upon determining that the mobile phone, wearable device, thermostat, and wireless router are all in the environment and should be set up, the assistant device can determine the order to facilitate the setup of those devices to provide a better setup process. One way of facilitating the setup of those devices can include determining whether one device will use the resources provided by another device. For example, the mobile phone might be set up to access the wireless network provided by the router by using authentication credentials (e.g., including the service set identifier (SSID) and password) of the wireless network. However, the router can be set up without providing it with any other information or configuration data of the other devices. That is, the setup process for the router does not involve knowing details or having interactions regarding other devices. Thus, the router can be set up first. Next, the mobile phone can be set up. Because the assistant device knows the order that the devices will be set up, and that the first device set up was the router with its authentication credentials, the assistant device can guide the user through the setup of the mobile phone including instructing the user to input the authentication credentials of the wireless network provided by the router. The wearable device might be the type of device that should use information or interactions regarding both the mobile phone and the wireless router and, therefore, that can be set up next. For example, setting up the wearable device might involve selecting the SSID of the wireless network implemented by the wireless router, inputting a password, and then pairing via Bluetooth® the wearable device and mobile phone, which can include turning on the mobile phone's Bluetooth® functionality.

In at least one embodiment, the beacon signal includes a request to connect to the one or more IoT devices. The request to connect can be sent via LTE, LTE-Advanced, Wi-Fi, Bluetooth, ZigBee, EnOcean, Personal area networks, TransferJet, Ultra-wideband, WiMAX, HiperMAN, Li-Fi and/or IR. Upon receiving a connection request from the assistant device, the IoT device can accept the connect request, can prompt the assistant device for more information such as a password, and/or display the request to connect on the IoT device.

The assistant device can request 404 additional device information from the user such as a passcode, a password, a physical action and/or other information or actions for finalizing the setup. For example, as previously discussed, the assistant device can determine the setup process for the device. If the setup process involves the user having to provide a pin code or other type of information that should be provided to another device, a website, etc. then this can be requested. The user can provide the necessary information in response 105, which the assistant device can transmit connection request 406 to the IoT device 407, finalizing the setup.

The user response can be a verbal response, a physical gesture and/or a selection of a menu item either on the assistant device or a connected device. The verbal response can be captured by the assistant device and/or a connected IoT device. The assistant device can perform speech recognition on the captured verbal response. Speech recognition algorithms used can include one or more of Hidden Markov models, dynamic time warping-based speech recognition, neural networks, deep feedforward neural networks, end-to-end ASRs, and/or other similar algorithms.

In the embodiments where the assistant device is able to connect to a remote server, the assistant device may access the remote server to assist with IoT device identification and installation.

In at least one embodiment, voice activatable commands are stored in one or more of the local resources and/or one or more of the remote servers. In at least one embodiment, the remote server is a cloud server. Local resources can include assistant device local memory storage, storage directly connected to the assistant device, and/or storage of connected devices. The voice activatable commands include commands that a user can speak and cause a device to perform an action (e.g., "turn on light," "make coffee," "lock door," etc.). A voice activatable command can include one or more functions capable of being performed by a device. For example, voice activatable commands for a locking device can include the commands to lock and unlock.

The commands to turn on and off the lights can be voice activatable commands associated with one or more devices capable of turning on and off light. In at least one embodiment, the setup of a device includes assigning a device-specific adapter which maps the device functionality to one or more voice activatable commands. In at least one embodiment, the adapter is a driver.

The step of setting up the device can include determining the voice activatable commands available for said device and associating the device with said voice activatable commands. The step of setting up the device can also include acquiring and/or identifying the device-specific adapter, allowing the assistant device to operate the device. Thus, when a device is set up, the assistant device can identify the relevant voice activatable commands and determine the appropriate adapter associated with the device.

For example, once a smart thermostat is detected, the assistant device can provide audio instructions to the user that are useful for setup. Once the user completes the instructions and/or provides responses, the assistant device can identify voice activatable commands for the device such as voice activatable commands to control functions of the thermostat that set temperature, increase heat, or decrease heat. The assistant device can further identify the adapter which allows the assistant device to control the device functions (e.g., set temperature, increase heat, decrease heat, etc.). In an embodiment, upon completion of the setup process, a user can operate the devices via the assistant device. The user operation of the device can include oral speech such as the user instruction "set the temperature to 72 degrees", causing the assistant device to set the thermostat to 72 degrees.

In at least one embodiment, determining the appropriate adapter can include downloading the relevant adapter to a local resource. Determining the appropriate adapter can also include referencing the location of the adapter stored on a shared resource.

Additionally, the assistant device can store descriptive information about the devices such as the device's location, type, and/or color (e.g., kitchen, toaster, silver, etc.). In at least one embodiment, the descriptive information of only the connected devices is stored. For example, in this embodiment, the descriptive information of a device the user chose not to setup would not be stored. The configuration of this embodiment can conserve assistant device resources. The descriptive information can be stored on the local resources of the assistant device and/or on the remote server. The descriptive information can be added by the user as a part of the installation process. This information can be added via a user response and/or a user instruction. For example, the assistant device can prompt the user: "Thank you for performing the steps to set up the printer. Can you provide additional information about where the printer is located?" The user can respond with the location (e.g., "The printer is located in the living room."). The assistant device can process the user response with a speech recognition algorithm and determine that the descriptive information for the printer device is "living room." The descriptive information can also be set by user instruction. For example, the user can provide the instruction: "assistant device, please turn on the lamp in the living room." In response, the assistant device can send an instruction for the lamp to turn on and store the descriptive information about the lamp (e.g. "in living room"). In at least one embodiment, the user can respond and/or instruct the assistant device with one or more of speech, physical gesture, and/or textual input. In at least one embodiment, the descriptive information can include device information. In an embodiment, the descriptive information can exclude device information.

The descriptive information can also be derived via a machine learning algorithm. In at least one example, the machine learning algorithm can derive descriptive information by monitoring activity in the environment. For example, a light which is turned on right before the refrigerator is opened can be assigned the descriptive information of "kitchen." External information such as Internet websites, social media sites, and/or any other information not stored on the assistant device can be used to determine device information. The machine learning algorithm can include one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, supervised learning, unsupervised learning, semi-supervised learning, clustering algorithm, and/or classification algorithm.

In at least one embodiment, the user commands, user responses, descriptive information, and/or the device information can be used to build user profiles. In at least one embodiment, the information in the user profile can be used to determine the information that is stored in the local resources of the local devices versus the remote server. In at least one embodiment, external information (e.g., date, weather, news, social media) is used to build a user profile. Additionally, the assistant device can be configured to only allow specific users to provide commands and/or setup devices. For example, the assistant device can be set to have one or more primary users that can set up devices. In an example, the assistant device can be set to allow adults to setup devices and/or the assistant device can use a visual recognition and/or audio recognition algorithm to determine the age of the user.

In at least one embodiment, the assistant device can be configured to recognize phrases and/or gestures associated with voice activatable commands. For example, the assistant device can be taught to recognize that when a user instructs the device to "shut the door," the user means "lock door." In another example, the assistant device can be configured to recognize that when a user points to the door and snaps her fingers, the user is providing instructions to the assistant device to lock the door. The assistant device can learn the phrases and/or gestures associated with voice activatable commands by machine learning. In an embodiment, the user can set the phrases and/or gestures associated with voice activatable commands. For example, the user can tell the assistant device "When I say shut the door, I want you to lock the front door lock." The assistant device can use a speech recognition algorithm to determine the user input and store the alternate user activatable command (e.g., "shut the door") associated with the user activatable command (e.g., "lock door".) In at least one embodiment, the alternate user activatable commands are associated with the user profiles.

Figure 5:
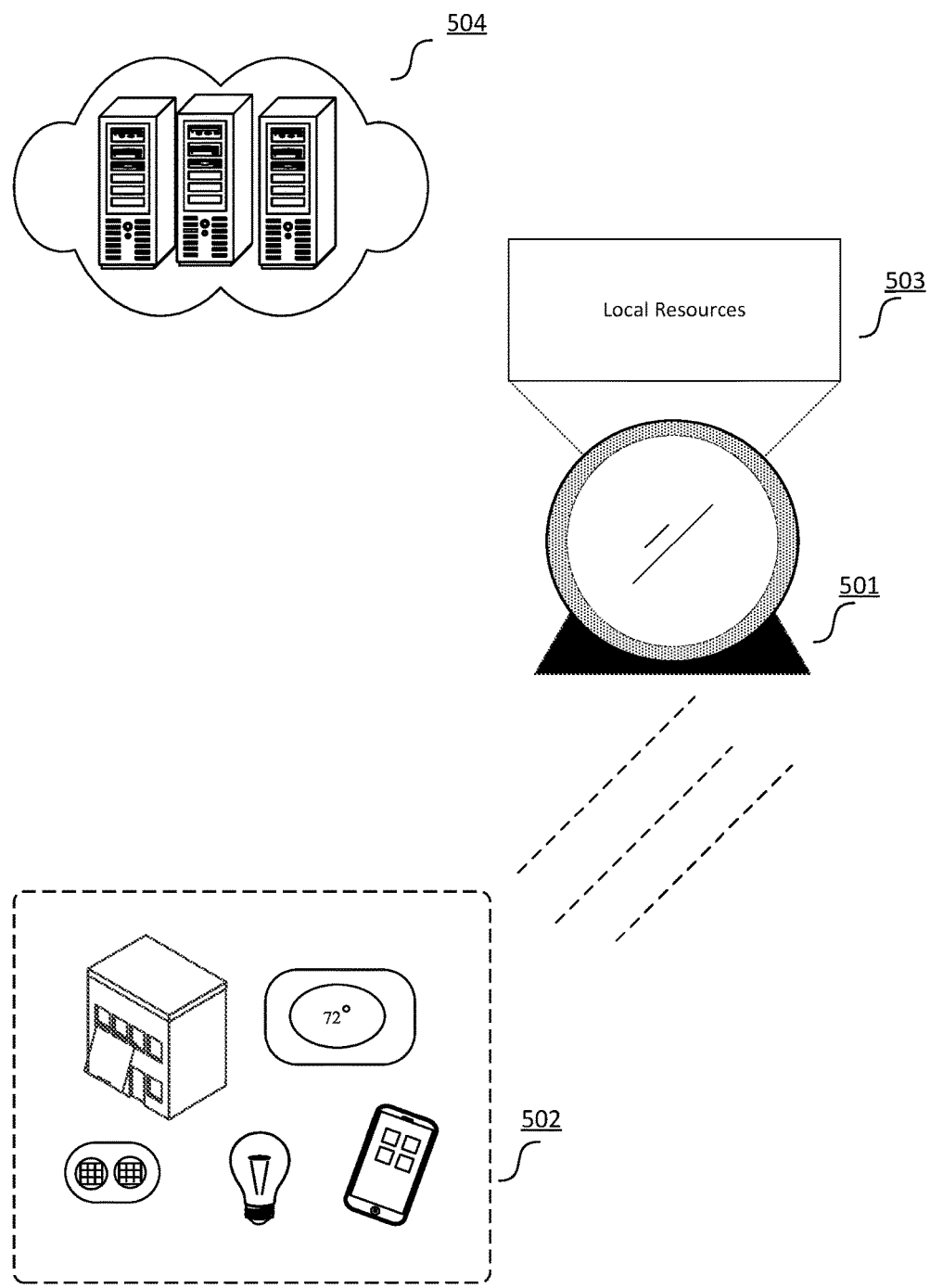
FIG. 5 illustrates an embodiment of the IoT device detection technique which includes visual recognition.

FIG. 5 illustrates an embodiment of the IoT device detection technique which includes visual recognition. The assistant device 501 can scan the surrounding environment to detect IoT devices 502 in the home. For example, assistant device 501 can generate image frames representing objects within its surrounding area. A visual recognition algorithm can be used to determine that IoT devices are present in the surrounding area. The visual recognition algorithm can determine an IoT device type. The assistant device may use local resources 503 (e.g., other devices accessible to assistant device 501 that might have already been set up) and/or remote servers 504 to identify the device and/or understand a user's responses. In at least one embodiment, the assistant device determines whether the visually recognized device is an IoT device that is already connected and/or whether the IoT device has sent identification information. In an example, whether an IoT device has sent identification information, the visually recognized device type can be used to assist the user with finalizing the setup and/or identifying the appropriate instructions to the users. For example, where two thermostats are detected, the assistant device can use visually recognized information to direct the user: "To finalize the setup for the thermostat located by the desk, please speak the passcode written on the thermostat screen." Thus, by analyzing the image frames of the surrounding environment, the assistant device can determine locations of the various IoT devices that should be set up. The setup process can include this information as it prompts the user through the steps. For example, as discussed above, the provided step-by-step instructions can include the location of the device, other objects close to the device (e.g., the thermostat located by the desk), etc. that can help the user with the setup process. In at least one embodiment, the visual recognition algorithm functionality can be used to automatically detect the passcodes displayed on devices and use the passcodes to expedite installation.

In at least one embodiment, once the assistant device receives the response from the one or more IoT devices, the assistant device initiates the connection. For example, when a phone is detected, the assistant device may ask "I have detected an iPhone; would you like me to connect to it?" If a user answers yes, the assistant device can provide instructions for the user to perform, including instructions to the user to configure IoT devices, read passcodes, and/or other instructions. In at least one embodiment, the assistant device can interpret non-verbal cues as a response. The non-verbal cues can include sign language and other physical movements. In at least one embodiment, the assistant device can supplement ambiguities in a user's verbal communication with non-verbal communication.

The assistant device can detect movements via one or more cameras. The movements can include body motion, face, and/or hand movements. The assistant device can further interpret the movements using a gesture recognition algorithm. The gesture recognition algorithm can include one or more of a skeletal-based algorithm, an appearance-based algorithm, and/or a 3D model-based algorithm. This feature allows for the user to interact with the assistant device by gestures. In at least one embodiment, the assistant device uses the combination of audio and video input to derive the user's communication, response and/or mood. For example, if the assistant device instructs the user to perform an action as part of the setup process, but the user throws her hands up in frustration, then this can be recognized as a gesture using video input. This gesture can be used to determine that the user is in a flustered mood. As another example, if the audio input includes words corresponding to frustration (e.g., "swear" words), then this can be recognized. If these situations are recognized, the assistant device can then repeat the instructions for the user to perform, slow down the verbal speech it provides using its speaker, etc. In at least one embodiment, user profiles can be built. The user profiles can include information about a user behavior. The user profile can include the user's typical movements. For example, a user profile can store that a user uses her hands to talk. The assistant device can use this profile information to eliminate false positives of frustration.

In at least one embodiment where the assistant device detects the user using sign language as the primary communication method, the assistant device will determine the user is deaf and communicate with the user via projected text, via the text display and/or via holographic displays. In at least one embodiment, the assistant device includes components to allow for holographic displays including touchable holographic displays. In at least one embodiment, a holographic accessory device is attached to the assistant device to allow for holographic display. The hologram can be displayed using laser as the light source, electroholographic, full parallax and/or Micro-Electro-Mechanical Systems (MEMS) technology. In at least one embodiment, the holographs are touchable holographs. The assistant device can include a sensor, allowing the device to sense air movement, which allows for the haptic feedback necessary for some embodiment of the touchable holographs.

In at least one embodiment, the assistant device is configured with a cellular connection. In an example, the assistant device can utilize the cellular connection when the Wi-Fi is not available.

Figure 6:
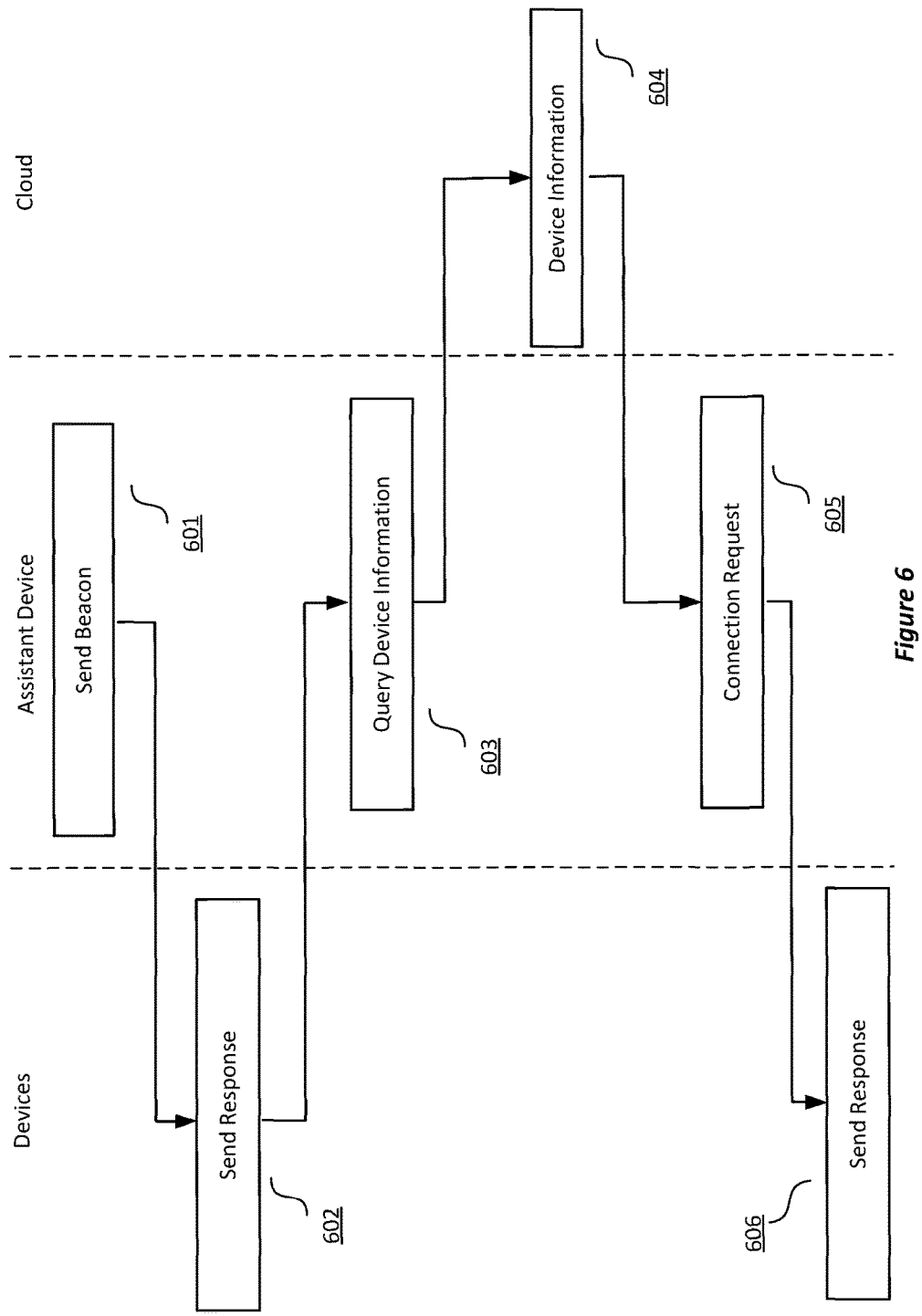
FIG. 6 illustrates an embodiment of the setup process including querying the cloud for additional device information.

FIG. 6 illustrates an embodiment of the setup process including querying the cloud for additional device information. The assistant device sends a beacon 601, and the IoT devices send a response 602 to the beacon with identifying information. The assistant device receives identifying information and queries the local resources 603 for additional information necessary to finalize the setup. The additional information can include password, passcode, device information, and/or other information that can be used to connect the IoT device to the assistant device. Cloud resources 604 can be used to query for additional information. Once the assistant device acquires adequate information to initiate the connection 605 to the IoT devices, it sends a request to the IoT device 606.

Figure 7:
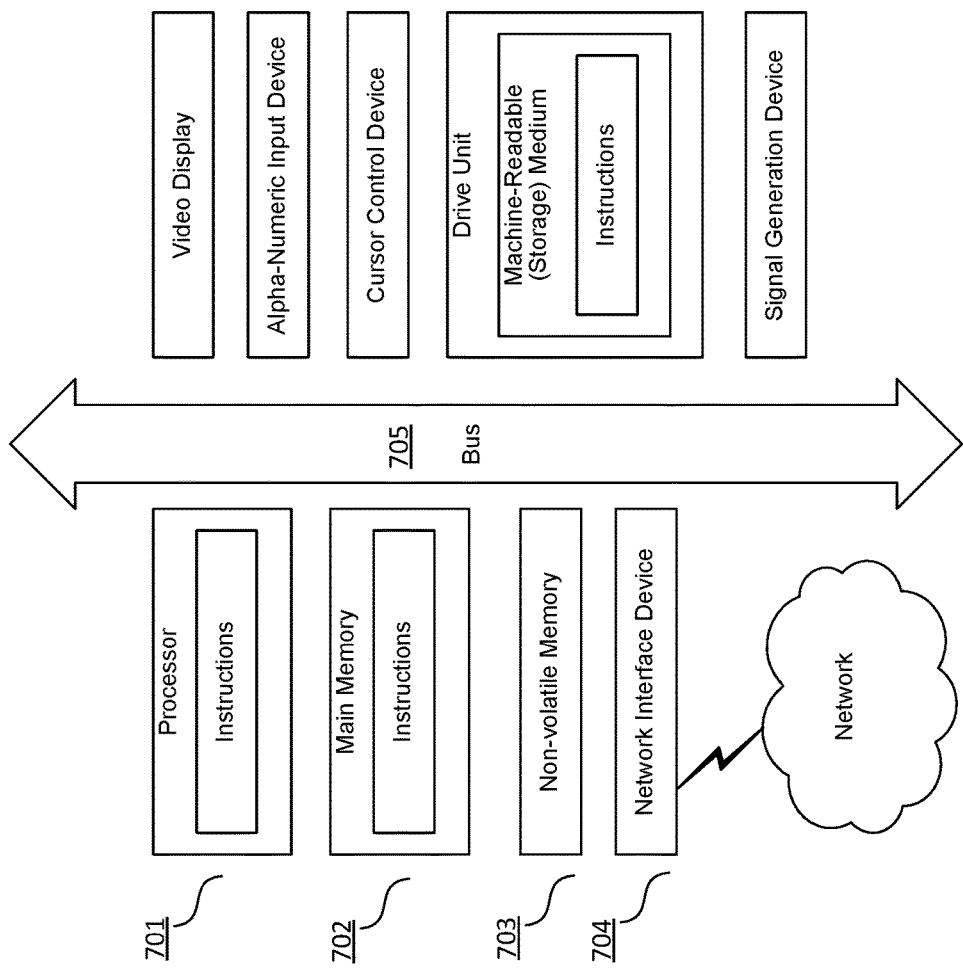
FIG. 7 illustrates an embodiment of the assistant device, including a processor, memory, non-volatile memory, and an interface device.

In FIG. 7, the assistant device includes a processor 701, memory 702, non-volatile memory 703, and an interface device 704. Various common components (e.g., cache memory) are omitted for illustrative simplicity. The assistant device is intended to illustrate a hardware device on which any of the components described in the example of FIGS. 1-6 (and any other components described in this specification) can be implemented. The components of the assistant device can be coupled together via a bus 705 or through some other known or convenient device.

In at least one embodiment the assistant device can be operated using an ambient operating system such as a meta-operating system targeted at IoT and ubiquitous computing scenarios. Ambient OSes orchestrate ambient resources and provide a set of abstractions and APIs which simplify the development of dynamic ambient-oriented services and applications that span the reach of a single device.

The processor 701 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 702 is coupled to the processor by, for example, a bus. The memory can include, by way of example but not limitation, random access memory (RAM), such as dynamic RAM (DRAM) and static RAM (SRAM). The memory can be local, remote, or distributed.

The bus 705 also couples the processor 701 to the non-volatile memory 703 and drive unit. The non-volatile memory 703 is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software is typically stored in the non-volatile memory 703 and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 705 also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 7 reside in the interface.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An assistant device, comprising:
a display screen;
a microphone;
a speaker;
a camera;
one or more processors; and
memory storing instructions, wherein the one or more processors are configured to execute instructions such that the one or more processors and memory are configured to:
receive a first image data depicting one or more devices in an environment of the assistant device from the camera;
identify the one or more devices depicted in the first image data using a visual recognition algorithm;
determine that the one or more devices in the received first image data were not previously connected to the assistant device;
determine device information representing identifying information associated with the one or more devices not previously connected to the assistant device;
determine a device type of the one or more devices based on the device information using one or more of local resources and/or one or more of cloud servers;
determine first audio installation instructions for the one or more devices based on the device type, the first audio installation instructions providing steps to install the one or more devices;
provide the first audio installation instructions via the speaker;
receive a second image data depicting a user performing the first audio installation instructions;
determine characteristics of the user performing the first audio installation instructions based on the second image data;
determine second audio installation instructions for the one or more devices based on the device type and the characteristics of the user, the second audio installation instructions providing the steps to install the one or more devices differently than the providing of the steps by the first audio installation instructions;
provide the second audio installation instructions via the speaker;
receive a user response via the microphone and the camera;
determine descriptive information associated with the one or more devices based on the user response;

set up the assistant device to operate the one or more devices, the set up including determining one or more of voice activatable commands and an adapter associated with the one or more devices;

receive a user instruction, wherein speech recognition of the user instruction includes one or more voice activatable commands and one or more descriptive information;

identify the one or more devices associated with the descriptive information; and transmit a request to the one or more devices to perform an action associated with the one or more voice activatable commands.

2. The assistant device of claim 1, wherein determining the device type includes analyzing an image frame of the image using the visual recognition algorithm.

3. The assistant device of claim 2, comprising determination a location of the one or more devices by analyzing the image frame of the image.

4. The assistant device of claim 1, wherein determining characteristics of the user performing the first audio installation instructions includes determining physical movements of the user while performing the first audio installation instructions.

5. The assistant device of claim 1, wherein providing the steps to install the one or more devices differently than the providing of the steps by the first audio installation instructions includes providing the second audio installation instructions at a slower speed than the first audio installation instructions.

6. A method, comprising:
receiving a first image data depicting one or more devices in an environment of an assistant device from a camera;
identifying the one or more devices depicted in the first image data using a visual recognition algorithm;
determining that the one or more devices in the received first image data were not previously connected to the assistant device;
determining device information representing identifying information associated with the one or more devices not previously connected to the assistant device;
determining a device type of the one or more devices based on the device information using one or more of local resources or one or more of cloud servers;
determining first audio installation instructions for the one or more devices based on the device type, the first audio installation instructions providing steps to install the one or more devices;
providing the first audio installation instructions via a speaker;
receiving a second image data depicting a user performing the first audio installation instructions;
determining characteristics of the user performing the first audio installation instructions based on the second image data;
determining second audio installation instructions for the one or more devices based on the device type and the characteristics of the user, the second audio installation instructions providing the steps to install the one or more devices differently than the providing of the steps by the first audio installation instructions;
providing the second audio installation instructions via the speaker;
receiving a user response via a microphone and the camera;
determining descriptive information associated with the one or more devices based on the user response;

setting up the assistant device to operate the one or more devices, the set up including determining one or more of voice activatable commands and an adapter associated with the one or more devices;

receiving a user instruction, wherein speech recognition of the user instruction includes one or more voice activatable commands and one or more descriptive information;

identifying the one or more devices associated with the descriptive information; and transmitting a request to the one or more devices to perform an action associated with the one or more voice activatable commands.

7. The method of claim 6, wherein determining the device type includes analyzing an image frame of the image using the visual recognition algorithm.

8. The method of claim 7, comprising determination a location of the one or more devices by analyzing the image frame of the image.

9. The method of claim 6, wherein determining characteristics of the user performing the first audio installation instructions includes determining physical movements of the user while performing the first audio installation instructions.

10. The method of claim 6, wherein providing the steps to install the one or more devices differently than the providing of the steps by the first audio installation instructions includes providing the second audio installation instructions at a slower speed than the first audio installation instructions.

11. A computer program product including one or more non-transitory computer-readable media storing computer program instructions, execution of which by a processor causes a processing system to perform operations comprising:
receiving a first image data depicting one or more devices in an environment of an assistant device from a camera;
identifying the one or more devices depicted in the first image data using a visual recognition algorithm;
determining that the one or more devices in the received first image data were not previously connected to the assistant device;
determining device information representing identifying information associated with the one or more devices not previously connected to the assistant device;
determining a device type of the one or more devices based on the device information using one or more of local resources or one or more of cloud servers;
determining first audio installation instructions for the one or more devices based on the device type, the first audio installation instructions providing steps to install the one or more devices;
providing the first audio installation instructions via a speaker;
receiving a second image data depicting a user performing the first audio installation instructions;
determining characteristics of the user performing the first audio installation instructions based on the second image data;
determining second audio installation instructions for the one or more devices based on the device type and the characteristics of the user, the second audio installation instructions providing the steps to install the one or more devices differently than the providing of the steps by the first audio installation instructions;
providing the second audio installation instructions via the speaker;

receiving a user response via a microphone and the camera;

determining descriptive information associated with the one or more devices based on the user response;

setting up the assistant device to operate the one or more devices, the set up including determining one or more of voice activatable commands and an adapter associated with the one or more devices;

receiving a user instruction, wherein speech recognition of the user instruction includes one or more voice activatable commands and one or more descriptive information;

identifying the one or more devices associated with the descriptive information; and transmitting a request to the one or more devices to perform an action associated with the one or more voice activatable commands.

12. The computer program product of claim 11, wherein determining the device type includes analyzing an image frame of the image using the visual recognition algorithm.

13. The computer program product of claim 12, comprising determination a location of the one or more devices by analyzing the image frame of the image.

14. The computer program product of claim 11, wherein determining characteristics of the user performing the first audio installation instructions includes determining physical movements of the user while performing the first audio installation instructions.

15. The computer program product of claim 11, wherein providing the steps to install the one or more devices differently than the providing of the steps by the first audio installation instructions includes providing the second audio installation instructions at a slower speed than the first audio installation instructions.

* * * * *